United States Patent
Hu et al.

(10) Patent No.: US 8,553,552 B2
(45) Date of Patent: Oct. 8, 2013

(54) STATELESS LOAD BALANCER IN A MULTI-NODE SYSTEM FOR TRANSPARENT PROCESSING WITH PACKET PRESERVATION

(75) Inventors: Michael W. Hu, Portland, OR (US); Andrew P. Alleman, Portland, OR (US)

(73) Assignee: RadiSys Corporation, Hillsboro, OR (US)

( * ) Notice: Subject to any disclaimer, the term of this patent is extended or adjusted under 35 U.S.C. 154(b) by 63 days.

(21) Appl. No.: 13/369,070

(22) Filed: Feb. 8, 2012

(65) Prior Publication Data
US 2013/0201989 A1 Aug. 8, 2013

(51) Int. Cl.
*H04L 12/26* (2006.01)
*H04L 12/28* (2006.01)
*G06F 15/173* (2006.01)

(52) U.S. Cl.
USPC .......................... 370/235; 370/392; 709/238

(58) Field of Classification Search
None
See application file for complete search history.

(56) References Cited

U.S. PATENT DOCUMENTS

| | | | |
|---|---|---|---|
| 5,495,426 A * | 2/1996 | Waclawsky et al. | 709/226 |
| 7,613,110 B1 * | 11/2009 | Blair | 370/230 |
| 7,821,925 B2 | 10/2010 | Davies | |
| 8,125,905 B2 * | 2/2012 | Buckman et al. | 370/231 |
| 8,300,641 B1 * | 10/2012 | Vincent et al. | 370/392 |
| 2004/0098499 A1 | 5/2004 | Tamai | |
| 2009/0279432 A1 * | 11/2009 | Solis et al. | 370/235 |
| 2009/0307334 A1 | 12/2009 | Maltz et al. | |
| 2010/0265824 A1 | 10/2010 | Chao et al. | |
| 2011/0026403 A1 | 2/2011 | Shao et al. | |
| 2012/0250686 A1 * | 10/2012 | Vincent et al. | 370/392 |

OTHER PUBLICATIONS

Radley, James, "Load Balancing Between Server Blades Within ATCA Platforms," Continuous Computing, Oct. 2007, pp. 1-4.
Cisco Data Center Infrastructure 2.5 Design Guide, Cisco Validated Design 1, Dec. 6, 2007, 180 pages.
"Load Distributuion in Telecom Servers Using Focalpoints, Reduces system cost and improves system flexibility," Fulcrum Microsystems, White Paper, Jul. 2008, pp. 1-7.

* cited by examiner

*Primary Examiner* — Clemence Han
(74) *Attorney, Agent, or Firm* — Stoel Rives LLP

(57) ABSTRACT

Stateless load balancing of network packets within a system avoids detection by a network client or end user for deep packet inspection or other bump-in-the-wire applications. At least one header field of a received packet is used in generating a hash value. The hash value is used to identify a processing resource within the system for processing the received packet. Before being sent to the identified resource, the received packet is encapsulated with a new header that includes an indication of ingress port. The encapsulation does not modify the original packet. On a return path from the identified processing resource, the ingress port is determined from the encapsulated packet, the encapsulated packet is decapsulated to obtain a recovered packet that is identical to the received packet, and the recovered packet is forwarded to the network through an egress port as determined from the recovered ingress port.

31 Claims, 5 Drawing Sheets

STATELESS LOAD BALANCER IN A MULTI-NODE SYSTEM FOR TRANSPARENT PROCESSING WITH PACKET PRESERVATION

TECHNICAL FIELD

This disclosure relates generally to balancing workload distribution in a distributed computing environment. In particular, this disclosure relates to methods, systems, and computer readable media for stateless load balancing of network traffic flows in multi-node systems for deep packet inspection or other applications where network transparency or idempotency is desired.

BACKGROUND OF THE DISCLOSURE

A bump-in-the wire architecture may be used for deep packet inspection where it may be desired to perform processing on packets in a manner that is not detectable by other network elements or end users, and in a manner that does not affect the addressing or routing of packets through the network. For example, law enforcement agencies may be authorized to intercept real time data carrying multimedia applications, such as voice or video, transmitted over the Internet without being detected by the call participants. Other deep packet inspection or bump-in-the-wire applications include, for example, ensuring quality of service for certain packet types, meeting network traffic and bandwidth requirements, detecting malware, enforcing business conduct policies or enforcing network subscriber policy agreements on information exchanged inside and outside a company, monitoring, and filtering.

Such services may be implemented using a distributed architecture, wherein various processor and memory resources are distributed across multiple processing resources. Bladed systems may be used, for example, to scale deep packet inspection functions across multiple server blades. Load balancing is used in distributed architectures to determine which processing resources or server blades are assigned to handle packets corresponding to a particular traffic flow. Certain load balancers, however, are provided as expensive front end devices (e.g., external to the bladed system) or modify packet headers or other data in a way that may affect network addressing/routing or that may be detectable by other network elements or end users.

SUMMARY OF THE DISCLOSURE

In one embodiment, a method provides stateless load balancing of network packets within a system in communication with a network. The system includes a switch in communication with a plurality of processing resources configured to avoid detection by a network client or end user. The method includes receiving, at the switch, a packet through a port from the network. The received packet includes one or more original headers comprising a plurality of fields for directing the received packet through the network. The method further includes hashing at least one of the fields of the one or more original headers to generate a hash value, indexing a hashing table using the hash value to identify a processing resource within the system for processing the received packet, and encapsulating the received packet to produce an encapsulated packet with an outer header that includes at least an indication of the port through which the received packet was received. The encapsulated packet maintains, without any modification, the one or more original headers as received from the network in the received packet. The method also includes forwarding, from the switch, the encapsulated packet to the identified processing resource within the system.

On a return path, according to certain embodiments, the method includes receiving, at the switch, the encapsulated packet on the return path from the identified processing resource within the system, and determining that the encapsulated packet on the return path includes the outer header. The method also includes determining, from the outer header, the port through which the received packet within the encapsulated packet was received from the network. Based on the port through which the received packet was received from the network, the method determines an egress port for returning the packet to the network. The method also includes decapsulating the encapsulated packet to obtain a recovered packet that is identical to the received packet, and forwarding the recovered packet through the egress port to the network.

In certain embodiments, the egress port is the same as the port through which the received packet was received from the network. In other embodiments, the egress port is different than the port through which the received packet was received from the network, and the egress port is selected based on a mapping function performed on the port through which the received packet was received from the network.

In certain embodiments, the outer header further includes forwarding or addressing information for directing the encapsulated packet to the identified processing resource within the system.

In certain embodiments, the identified processing resource within the system performs application processing on the encapsulated packet. A set of processing resources comprises a load balancing group that is assigned the specific application processing.

In certain embodiments, the method further includes classifying the received packet based on packet header or other packet data to determine the services assigned to be performed on different types of packet flows. The identified processing resource may be a member of a load balancing group corresponding to a classification identified for the received packet.

In certain embodiments, the encapsulating includes adding a new media access control (MAC) header to the received packet using a MAC-in-MAC encapsulation scheme. The new MAC header includes a tag identifying the port through which the received packet was received. In certain such embodiments, the hashing table identifies next hop information for inclusion in the new MAC header for routing the encapsulated packet within the system.

In certain embodiments, the encapsulating includes adding a virtual local area network (VLAN) tag to the received packet. The VLAN tag identifies the port through which the received packet was received. In certain such embodiments, the hashing table identifies next hop information for inclusion in the VLAN tag for routing the encapsulated packet within the system.

In certain embodiments, the encapsulating includes adding a multiprotocol label switching (MPLS) header to the received packet. In certain such embodiments, the hashing table identifies next hop information for inclusion in the MPLS header for routing the encapsulated packet within the system.

Additional aspects and advantages will be apparent from the following detailed description of preferred embodiments, which proceeds with reference to the accompanying drawings.

BRIEF DESCRIPTION OF THE DRAWINGS

Non-limiting and non-exhaustive embodiments of the disclosure will now be described in more detail, by way of example only, with reference to the accompanying drawings, in which.

DETAILED DESCRIPTION OF PREFERRED EMBODIMENTS

Figure 1:
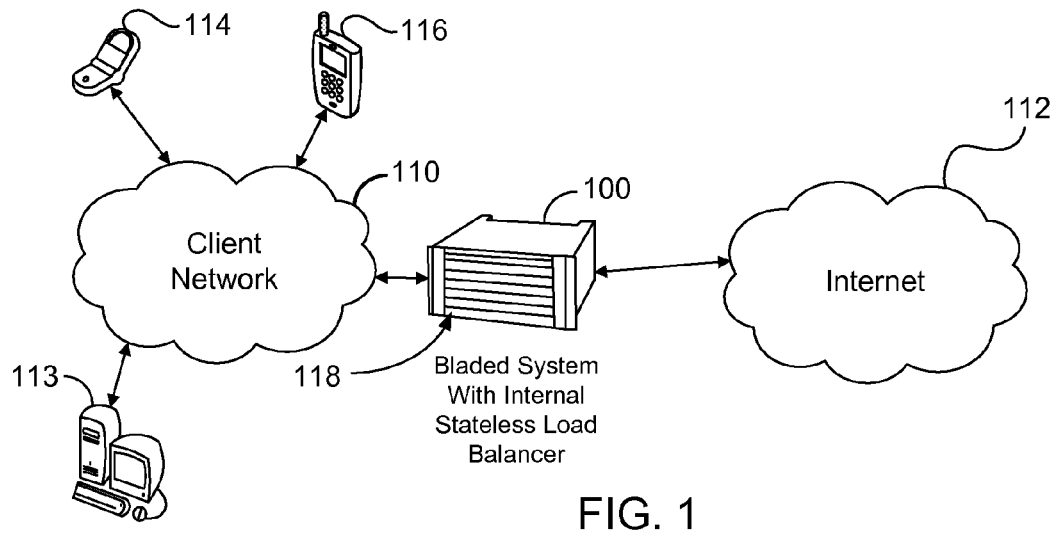
FIG. 1 is a block diagram of a bladed system connecting two systems or networks according to one embodiment.

In certain embodiments disclosed herein, stateless load balancing is used to distribute network packets received by a distributed system across a set of processing resources within the system. As used herein, "stateless" is a broad term having its normal and customary meaning in the art and includes load balancing that considers each packet individually and independently, in a memoryless manner without considering previous decisions, yet is able to make consistent load balancing decisions to determine the processing resource for like packets. The load balancing is performed by the system's switching device, which reduces cost and complexity. In certain embodiments, the distributed system comprises a bladed system having, for example, an Ethernet backplane. The disclosed load distribution uses packet encapsulation to fully preserve the original packets for deep packet inspection or other bump-in-the-wire applications. Each original packet is encapsulated in another packet with a new header (or is otherwise tagged with data) that conveys information about the packet such as an identifier for the ingress port as well as forwarding and/or addressing information for internal use within the system. While the new (outer) heading may be modified by the system, the original packet is kept fully intact without any modification.

Although any type of distributed system, bladed system, or modular computer, may be used, certain example load balancing embodiments disclosed herein are incorporated into universal communication computing platforms based on architectures like the Advanced Telecommunications Computing Architecture (ATCA). In other words, certain examples disclosed herein are based on the ATCA architecture to provide the ability to improve overall system performance while at the same time reducing the system footprint and space requirements. The ATCA architecture includes a high-speed Ethernet network that can be extended through a rear transition module (RTM). With the use of a modern operating system (e.g. enterprise LINUX-CGE), ATCA provides a powerful processing platform with multiple processors. Skilled persons will recognize from the disclosure herein that a bladed system may also include any other chassis-based system with modular blades.

In certain embodiments, a load balancer is implemented in the Ethernet switch on a hub blade of an ATCA system, leveraging the switch's ability to perform a hashing function to statistically distribute packets across a set of processing resources. Encapsulation is used for packets sent from the load balancer across the backplane to node blades (or processing resources), which perform some type of application processing (e.g., deep packet inspection, policy enforcement, lawful intercept, or other packet process). Node blades send packets back to the load balancer using the same encapsulation scheme. The load balancer decapsulates the packet to recover the original, unmodified packet, and then transmits the packet back out to the network.

Certain embodiments disclosed herein leverage an existing capability within ATCA (or any Ethernet switch). Specifically, certain embodiments leverage the hub blade Ethernet switching device's native capabilities to perform load balancing rather than requiring a separate, more expensive dedicated solution. Furthermore, certain disclosed embodiments provide tighter integration with application node blades as compared to an external load balancer.

Example load balancing systems and methods described herein fully preserve packets used in deep packet inspection or bump-in-the-wire applications via an Ethernet switch-based stateless, statistical load balancer, while including necessary information within the packet such as forwarding information and ingress/egress network I/O (input and output) port information. As discussed in detail below, the load balancer uses a reversible packet encapsulation such as MAC-in-MAC, VLAN tagging or MPLS (e.g., L2VPN or simply MPLS label stacking).

Reference is now made to the figures in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments can be practiced without one or more of the specific details, or with other methods, components, or materials. Further, in some cases, well-known structures, elements, materials, or operations are not shown or described in detail in order to avoid obscuring aspects of the invention. Furthermore, the described features, structures, or characteristics may be combined in any suitable manner in one or more embodiments.

Embodiments may include various steps, which may be embodied in machine-executable instructions to be executed by a general-purpose or special-purpose processor or computer. Alternatively, the steps may be performed by hardware components that include specific logic for performing the steps or by a combination of hardware, software, and/or firmware.

Embodiments may also be provided as a computer program product including a non-transitory, machine-readable medium having stored thereon instructions that may be used to program a computer (or other electronic device) to perform the processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/computer-readable medium suitable for storing electronic instructions.

FIG. 1 is a block diagram of a bladed system 100 connecting two systems or networks 110, 112 according to one embodiment. In this example, the bladed system 100 connects a client network 110 to the Internet 112. The client network 110 may be any communication network or combination of networks (e.g., wired and/or wireless local area network, wide area network, packet switched telephone network, and/or cellular telephone network) that allows end user devices to communicate through the Internet 112. The end user devices may include, for example, a computer 113, a cellular phone 114, a smart phone 116, or any other mobile device. In addition to connecting the client network 110 to the Internet 112, or in other embodiments, the bladed system 100 may connect two or more client systems (e.g., two or more local area networks distributed among a company's different office locations) and/or may be part of a plurality of bladed systems within a data center, computing center, and/or switching center.

As discussed above, the bladed system 100 in this example has an ATCA architecture with a plurality of modular blades 118. However, other types of bladed systems, distributed systems, or modular computers can also be used. The blades 118 include, for example, one or more switches, processors, and memory devices. Processor blades may be configured, for example, as central processing units (CPUs), graphic processing units (GPUs), digital signal processors (DSPs), or network processing units (NPUs) including servers and other networking devices or appliances. The blades 118 may be configured to perform a wide variety of services or applications such as mobile network applications, wireless core network applications, voice over IP (VOIP) applications, conferencing applications, other media services involving voice, video, and data, and services associated with deep packet inspection. Network equipment providers are making increased use of deep packet inspection technology to identify applications and network usage so as to deliver real-time information about the network and enable a variety of applications such as policy enforcement, Internet offload gateways, video optimization, edge caching, radio access network (RAN) network monitoring, security, and/or lawful intercept.

The bladed system 100 includes an internal stateless load balancer (see FIG. 2) according to one embodiment. The various applications (e.g., traffic shaping and/or scheduling, content-aware, security, monitoring, filtering, and other packet processing applications) running in the respective blades 118 share a common characteristic of being dynamically stateful only within the context of individual sessions and flows. Consequently, many such packet processing applications can be implemented on an array of individual nodes, each serving an allocated subset of user sessions and flows. A stream of packets associated with a particular application running on a specific client device may be referred to herein as a "flow." In certain embodiments, all packets within a particular flow are forwarded to the same processing resource or blade 118 so as to maintain some flow-related state information.

A flow may be fully identified from packet attributes such as Layer 2 (Ethernet) source and destination media access control (MAC) addresses, Layer 3 IP source and destination addresses (which may also include the protocol ID), Layer 4 source and destination port numbers, and/or application specific fields such as general packet radio service (GPRS) tunneling protocol GTP-U or GTP-C tunnel endpoint identifier (TEID), internet protocol security (IPsec) security parameter index (SPI), and session initiation protocol (SIP) attributes. Depending on the design of a service platform, some or all of these attributes may be used for identifying a flow. For example, when clients may be hiding behind a network address translation (NAT) firewall, then the port numbers may be used for differentiating individual clients (since many clients will share a common IP address). The protocol ID is useful when different service handling is required for different classes of transport protocol. For example, some types of applications, such as session border controller, may provide back-to-back proxy TCP termination but do not intervene on UDP packets. Use of Layer 2 MAC addresses for identifying flows is useful when an upstream service is using an IP address to hide the fact that the service is being provided by a server farm (with its own load balancer).

Figure 2:
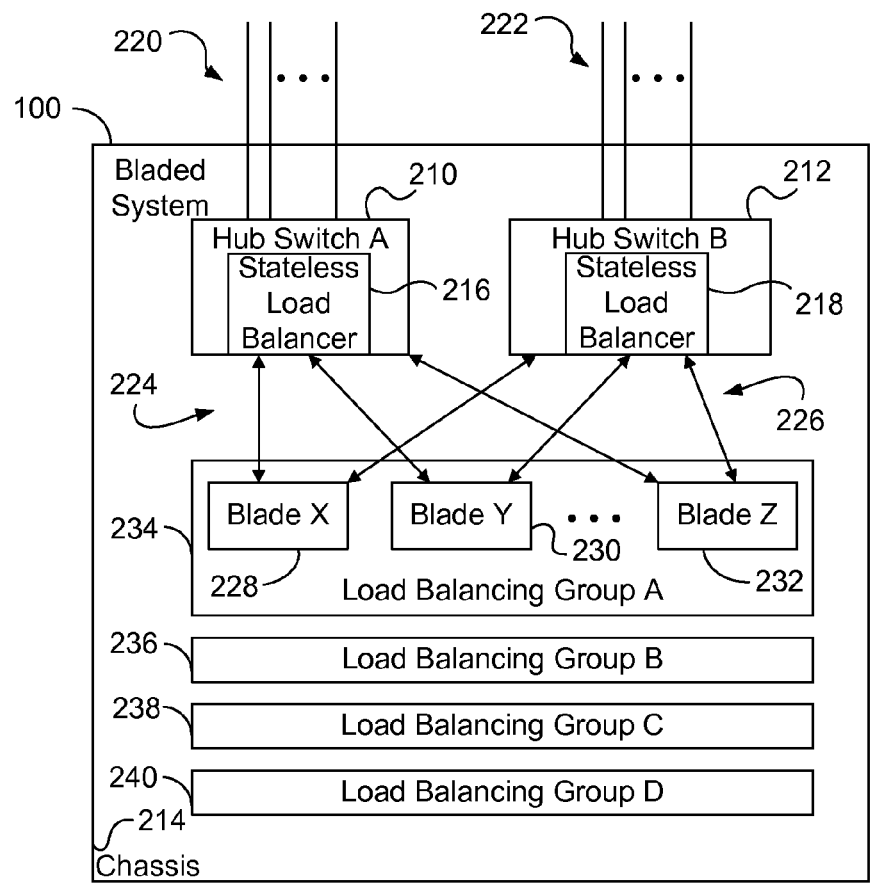
FIG. 2 is a block diagram illustrating the bladed system shown in FIG. 1 according to one embodiment.

In certain embodiments, the stateless load balancer is included in one or more of the bladed system's switches. Generally, an ATCA-based platform incorporates dual redundant switch blades to provide a backplane interconnect between the other nodes in the chassis. For example, FIG. 2 is a block diagram illustrating the bladed system 100 shown in FIG. 1 according to one embodiment. The bladed system 100 includes two Ethernet hub switches 210, 212 (shown as hub switch A and hub switch B) within a chassis 214. In this example, both hub switches 210, 212 include a respective stateless load balancer 216, 218. In certain embodiments, both hub switches 210, 212 carry traffic (at least in one direction, e.g., egress) at the same time. In such embodiments, both stateless load balancers 216, 218 may function (at least partially) simultaneously. In other embodiments, only one of the hub switches 210, 212 and its corresponding stateless load balancer 216, 218 operates at a time (e.g., the hub switch 210 and the stateless load balancer 216 are in active mode and the hub switch 212 and the stateless load balancer 218 are in standby mode in case of a failure). In another embodiment, a single stateless load balancer may be included within the bladed system 100 and may be accessed by one or both hub switches 210, 212. In yet another embodiment, the bladed system 100 may include a single hub switch that includes a single stateless load balancer.

In the embodiment shown in FIG. 2, each of the hub switches 210, 212 includes a plurality of I/O ports 220, 222 (three shown for each hub switch 210, 212) in communication with one or more external networks, such as the client network 110 and the Internet 112 shown in FIG. 1. Each of the hub switches 210, 212 also includes a plurality of ports 224, 226 (three shown for each hub switch 210, 212) in communication with respective blades 228, 230, 232 (shown as blade X, blade Y, and blade Z) within the chassis 214 of the bladed system 100. Various processing resources, including the blades 228, 230, 232, are assigned to respective load balancing groups 234, 236, 238, 240 (shown as load balancing group A, load balancing group B, load balancing group C, and load balancing group D). It should be noted that each of the blades 228, 230, 232 may include a plurality of processing resources, such as a plurality of processors, cores (e.g., in a multi-core processor), and/or threads (e.g., in a multi-threaded processor and/or operating system). In certain embodiments, certain processing resources may be assigned to a plurality of load balancing groups. For example, blade X may be assigned to both load balancing groups A and B.

Each load balancing group 234, 236, 238, 240 may be assigned to handle a particular application, type of function, or set of particular functions. Any number of processing resources may be assigned to any of the balancing groups 234, 236, 238, 240. In the example shown in FIG. 2, at least the blades 228, 230, 232 are assigned to the load balancing group 234 (load balancing group A). Although not shown for illustrative purposes, skilled persons will recognize from the disclosure herein that the other load balancing groups 236, 238, 240 also include processing resources (e.g., blades, processors, cores, and/or threads). Further, fewer than four load balancing groups (e.g., two load balancing groups) or more than four load balancing groups may also be used.

Incorporating a load balancing function into one or both hub switches 210, 212 avoids the need of having an additional blade in the system 100 to provide load balancing services. Also, since packets have to pass through at least one of the hub switches 210, 212 anyway, there is an advantage in terms of latency by not having the packets pass through an additional device. Certain switching technology (e.g., 10 GbE and/or 40 GbE switch technology) often incorporates sophisticated packet classifying and routing functions, and these features can be leveraged to provide a statistical load balancing service at relatively little incremental cost.

In certain embodiments, the stateless load balancers 216, 218 hash one or more fields of one or more packet headers to generate a hash value, and index a hashing table using the hash value to identify a processing resource within the system for processing the received packet. Although many different types of hashing and tables may be used, the stateless load balancers 216, 218 according to certain examples discussed herein leverage switch logic provided to support equal cost multipath protocol (ECMP), which is a method of statistically and evenly distributing packets over a set of parallel forwarding paths. It does not matter if ECMP is being used to distribute packets over a parallel set of links or in fact is being coerced into distributing packets to a bank of blade servers. Thus, ECMP is used in certain embodiments to reach a consistent routing decision per flow. ECMP is particularly well suited for load balancing as it has been designed to overcome potential difficulties caused by out-of-order packet delivery by hashing header fields to consistently identify and route flows.

Figure 3:
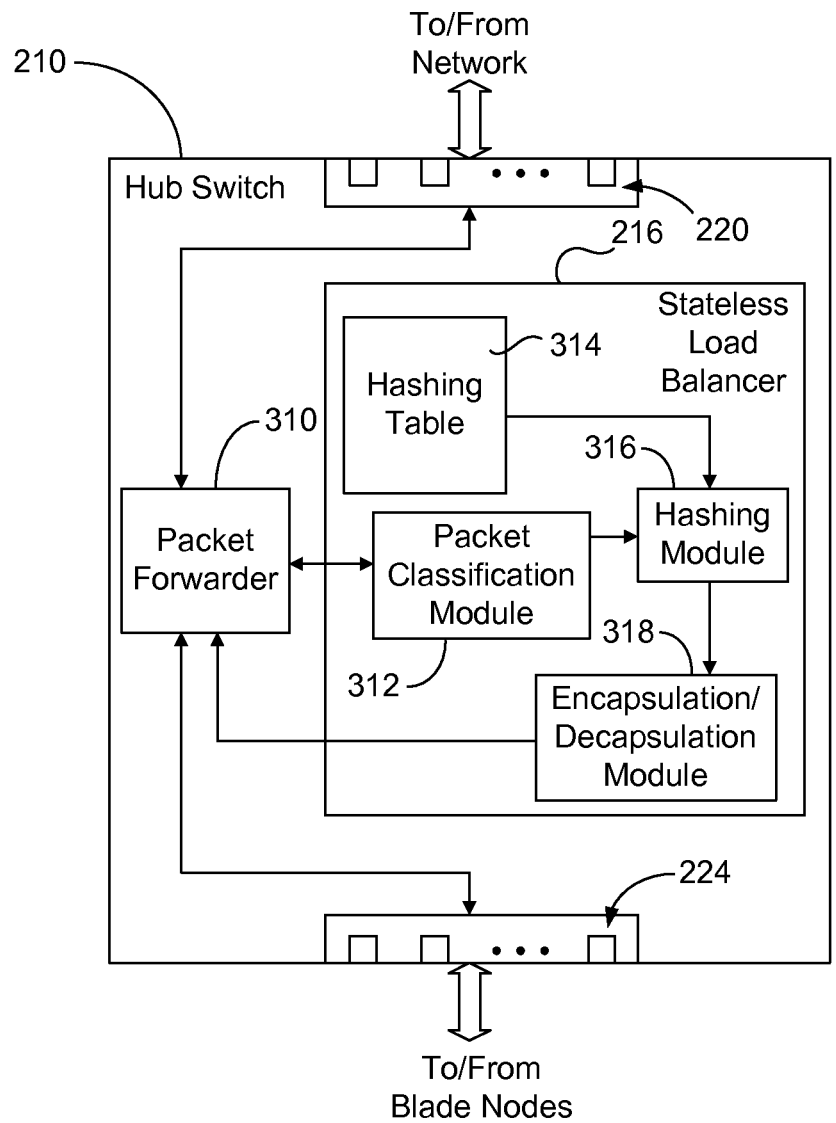
FIG. 3 is a block diagram of the hub switch shown in FIG. 2 including the stateless load balancer according to one embodiment.

FIG. 3 is a block diagram of the hub switch 210 shown in FIG. 2 including the stateless load balancer 216 according to one embodiment. The hub switch 210 also includes a packet forwarder 310 for receiving packets from external networks (e.g., the client network 110 and the Internet 112 shown in FIG. 1) through the I/O ports 220. The packet forwarder 310 provides the received packets to the stateless load balancer 216. The stateless load balancer 216 includes a packet classification module 312, a hashing module 316, hashing table 314 (e.g., an ECMP table), and an encapsulation/decapsulation module 318.

The packet classification module 312 receives incoming packets from the packet forwarder 310 and determines which of the incoming packets to load balance. Certain incoming packets may not need load balancing across processing resources of the hub switch 210. For example, the bladed system 100 may not be configured to provide any services for certain packets. In such situations, the packet classification module 312 returns the packets to the packet forwarder 310 for sending back to the external network through the appropriate I/O port 220 toward its intended destination. As another example, certain packets may be intended for a particular resource within the bladed system 100 (e.g., a single resource that does not belong to one of the load balancing groups 234, 236, 238, 240).

For packets identified for load balancing, the packet classification module 312 also assigns the packets to one of the load balancing groups 234, 236, 238, 240 based on the type of services to be performed for a particular flow. For example, the packet classification module 312 may determine that packets corresponding to a first type of flow are to be processed by one of a plurality of CPUs corresponding to the first load balancing group 234, packets corresponding to a second type of flow are to be processed by one of a plurality of NPUs corresponding to the second load balancing group 236, and so forth. The packet classification module 312 may determine which incoming packets to load balance and/or may assign the incoming packets to a particular load balancing group 234, 236, 238, 240 based on, for example, MAC addresses, one or more virtual local area network (VLAN) tags, EtherType fields, multiprotocol label switching (MPLS) labels, flow label fields (e.g., IPv4/v6 5-tuple), differentiated services code point (DSCP) fields, user defined fields, or other packet header information.

The packet classification module 312 sends incoming packets to be load balanced, along with indications of assigned load balancing groups, to the hashing module 316. For a particular packet, the hashing module 316 selects one of the processing resources within the indicated load balancing group to receive the packet. In particular, the hashing module 316 examines specific content in the header of a received packet, generates a hash value based on the header content, and uses the generated hash value as an index into the hashing table 314. For the particular identified load balancing group, the hashing table 314 maps the hash value to one of the processing resources within the identified load balancing group. For example, referring to FIGS. 2 and 3, if the packet classification module 312 identifies the load balancing group 234 for a particular packet, then the hashing module 316 performs hashing on the selected header content and uses the hash value to select one of the blades 228, 230, 232 within the load balancing group 234 to receive the packet. In certain embodiments, each packet belonging to a particular client traffic flow has the same destination information. Thus, every packet of that flow maps to the same entry in the hashing table 314. The hashing module 316 may perform a hash function using one or more header fields such as VLAN, IPv4/v6 5-tuple, MPLS labels, source IP address, destination IP address, UDP/TCP ports, MAC addresses, EtherType, GTP-U, GTP-C, SPI, SIP, and/or other header fields.

After the hashing module 316 selects one of the processing resources to process a packet, the encapsulation/decapsulation module 318 encapsulates the packet, without modifying either the header or the payload of the packet, with encapsulation information (e.g., a new header for the encapsulated packet) corresponding to the selected processing resource. The encapsulation/decapsulation module 318 provides temporary (e.g., for use within the bladed system 100), reversible packet encapsulation that conveys information such as ingress port and egress port. For internal addressing or routing purposes, the encapsulation information may also indicate how to route packets across multiple processing resources within a single blade. The ability to encapsulate additional flow-related information into a packet may also allow the stateless load balancer 216 to relay information to an application running on the selected processing resource that might not otherwise be discernable from the original packet itself.

After encapsulation, the packet forwarder 310 sends the encapsulated packet to the selected processing resource (e.g., blade) through one of the appropriate ports 224. After performing the desired service, the selected processing resource returns the encapsulated packet (without any modifications to the original received packet) to the encapsulation/decapsulation module 318 via packet forwarder 310. In certain embodiments, it is permissible to modify the encapsulation information in the new (outer) header so as to modify the load balancer's treatment of the packet in the return path.

For each packet received in the reverse path, the encapsulation/decapsulation module 318 determines whether the packet includes encapsulation (e.g., as part of load balancing when first received from the network). If the packet does not include encapsulation, then the packet is sent to the packet forwarder 310 to be sent back to the network (e.g., based on layer 2 or layer 3 forwarding information). If the packet includes encapsulation, the encapsulation/decapsulation module 318 performs decapsulation on the packet to remove the outermost header (or tags) that were added during the encapsulation process. The packet forwarder 310 then forwards the packet (in the original form as it was first received by the bladed system 100) to an egress port according to the ingress port information recovered from the outer header. In certain embodiments, the egress port is the same as that through which the packet was originally received, as determined by the encapsulation information. In other embodiments, the egress port is different than the port through which the received packet was received from the network. In such embodiments, the egress port may be selected based on a mapping function performed on the ingress port.

The reversible packet encapsulation may include, for example, MAC-in-MAC, VLAN tagging or MPLS (e.g., L2VPN or simply MPLS label stacking). In certain embodiments, different load balancing groups are configured to handle packets with different types of encapsulation. Thus, for example, a first packet classified for handling by load balancing group A may be encapsulated with MAC-in-MAC encapsulation and a second packet classified for handling by load balancing group B may be encapsulated with VLAN tagging.

MAC-in-MAC encapsulation may be applied as determined by hashing or ECMP processing (e.g., specified in a next hop table entry). MAC-in-MAC encapsulation fully preserves the original packet header (including double VLAN tags) and does not impact the ability to hash on IP headers. In certain embodiments, MAC-in-MAC encapsulation may also include internal packet tagging to convey additional information to the selected processing resource. In the reverse path according to one embodiment, the encapsulation/decapsulation module 318 uses a MAC-in-MAC configuration for decapsulation.

Figure 4:
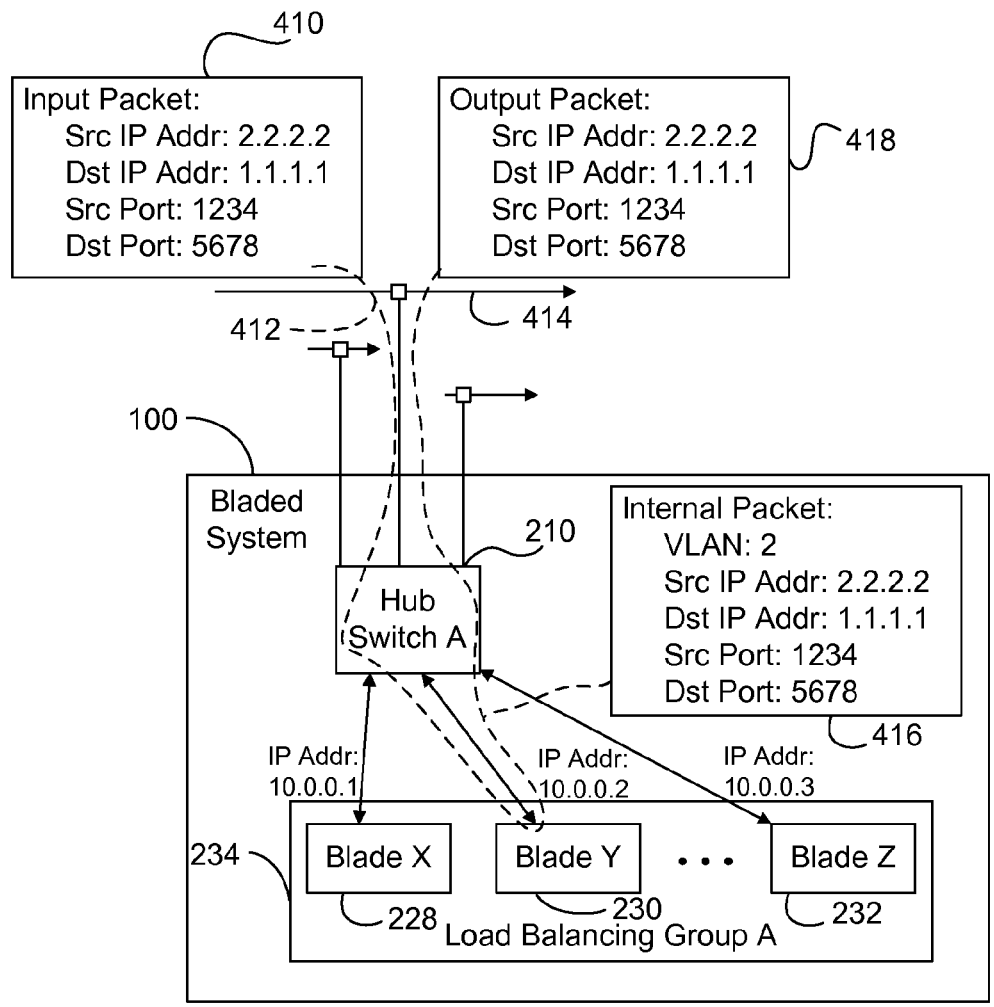
FIG. 4 is a block diagram illustrating the use of VLAN tagging according to one embodiment.

As another example, FIG. 4 is a block diagram illustrating the use of VLAN tagging according to another embodiment. In FIG. 4, a portion of the bladed system 100 is shown, including the hub switch 210 and the load balancing group 234 with blade 228, blade 230, and blade 232. In this example, the blade 228 is assigned to internal IP address (IP addr) 10.0.0.1, the blade 230 is assigned to internal IP address 10.0.0.2, and the blade 232 is assigned to internal IP address 10.0.0.3.

FIG. 4 shows an example input packet 410 having a source IP address (Src IP Addr) of 2.2.2.2, a destination IP address (Dst IP Addr) of 1.1.1.1, a source port (Src Port) of 1234, and a destination port (Dst Port) of 5678. An example flow path is shown by a dashed line 412 from an external network connection 414 through the hub switch 210 to the blade 230, and back through the hub switch 210 to the external network connection 414. On the ingress side of the flow path 412, the hub switch 210 applies VLAN tagging to indicate ingress/egress port at the hub switch 210 (e.g., VLAN 2 is assigned to port 2 corresponding to the external network connection 414), as indicated by an "internal packet" 416 shown in FIG. 4. On the egress path (e.g., from the blade 230 back toward the external network connection 414), the hub switch 210 maps VLAN 2 to port 2, and untags the packet before sending it back to the external network connection 414. Thus, FIG. 4 shows an output packet 418 at the external network connection 414 that is identical to the input packet 410. In certain embodiments, VLAN tagging is used only when untagged or single VLAN tagged packets are received by the bladed system 100. In other embodiments, VLAN tagging may also be used when receiving double VLAN tagged packets (e.g., using a triple VLAN tag configuration).

The capability to encapsulate and/or tag the packet with information needed for system processing while preserving original contents of the packet is useful for deep packet inspection or other bump-in-the-wire applications. Combining hash-based distribution and packet encapsulation allows for stateless load balancing distribution, while fully preserving the packets to avoid detection.

Figure 5:
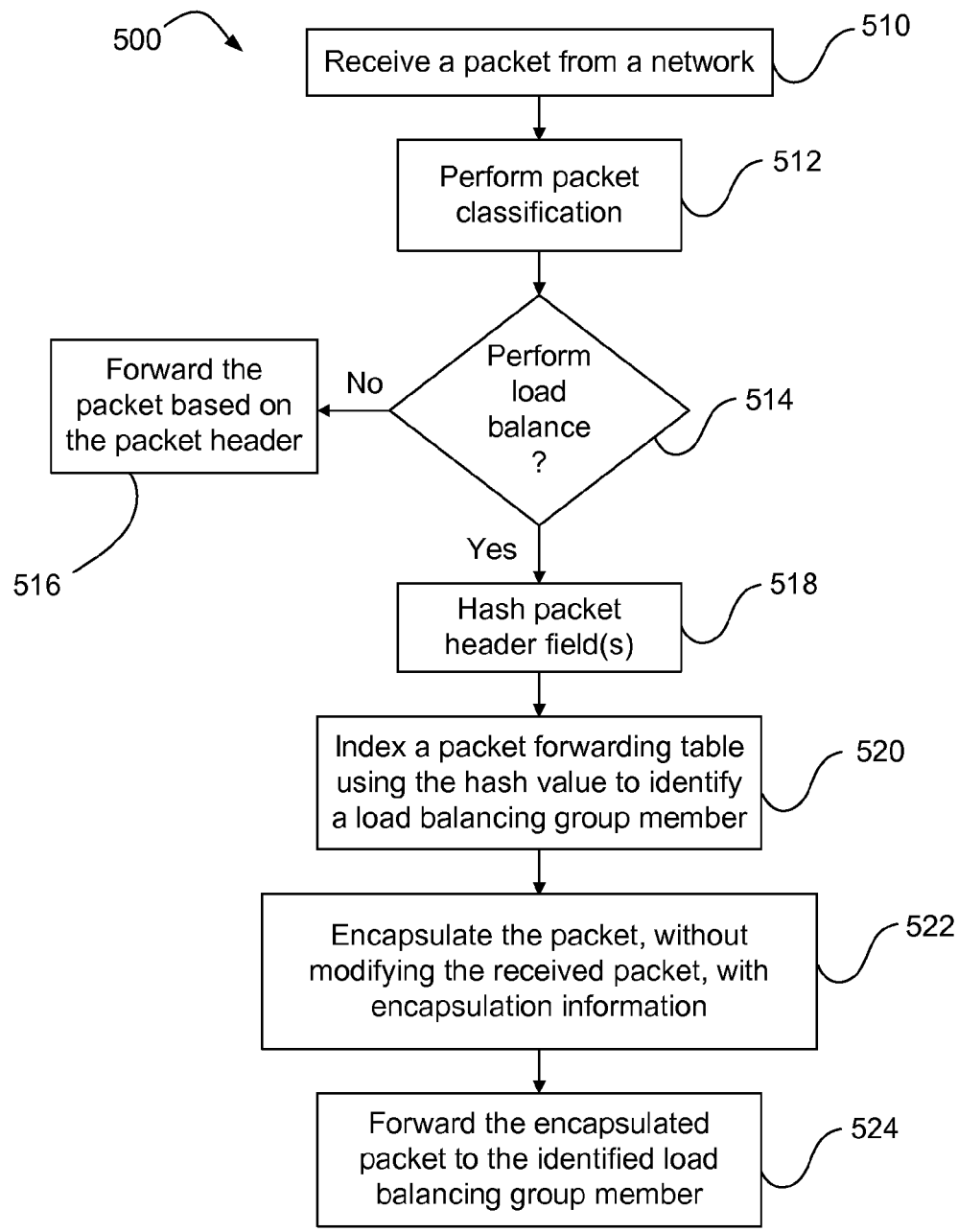
FIGS. 5 and 6 are flow diagrams of methods for stateless load balancing distribution within a bladed system according to certain embodiments.
Figure 6:
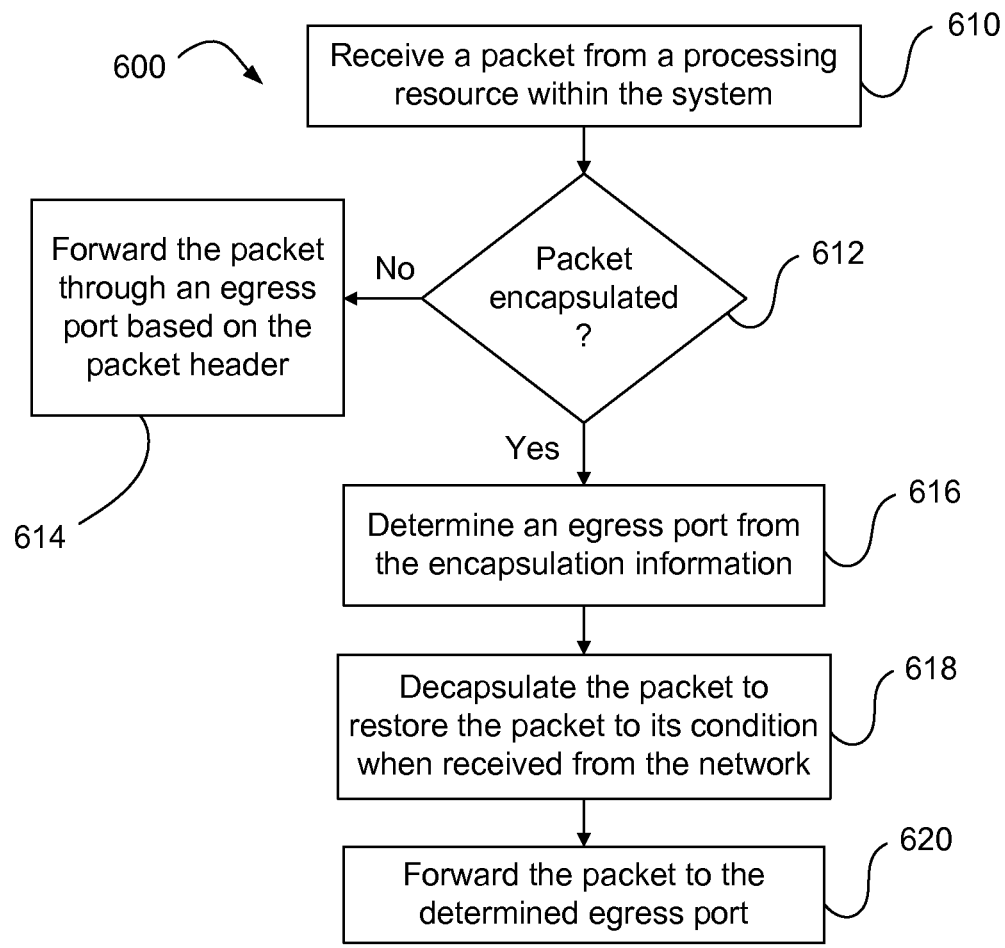

FIGS. 5 and 6 are flow diagrams of methods for stateless load balancing distribution within a bladed system according to certain embodiments. In particular, FIG. 5 illustrates a method 500 for an ingress path from a network to a load balancing group member (e.g., processing resources assigned to a particular load balancing group), and FIG. 6 illustrates a method for an egress path from the load balancing group member back to the network.

Referring to FIG. 5, for the ingress path, the method 500 includes receiving 510 a packet from a network and performing 512 packet classification on the received packet. As discussed above, packet classification identifies packets to load balance and assigns the identified packets to one of a plurality of load balancing groups. Thus, the method 500 includes querying 514 whether or not to perform load balancing on the received packet. If load balancing is not to be performed, the method 500 includes forwarding 516 the packet based on the packet header (e.g., the packet is processed via standard Layer 2 (Ethernet) and/or Layer 3 (IP) functions and procedures). Such a packet may or may not be encapsulated within the bladed system. As discussed above, certain packets may simply be returned to the network without any load balancing or further processing by resources within the bladed system (which is a possible result of standard Layer 2 and/or Layer 3 forwarding). If, however, the packet is to be load balanced, the method 500 includes hashing 518 one or more packet header fields to obtain a hash value, and indexing 520 a hashing table (e.g., an ECMP table) using the hash value to identify a load balancing group member within the selected load balancing group. The method 500 further includes encapsulating 522 the packet, without modifying the received packet, with encapsulation information (e.g., a new header), and forwarding 524 the encapsulated packet to the identified load balancing group member.

Referring to FIG. 6, for the egress path, the method 600 includes receiving 610 a packet from a processing resource within the system. The method 600 queries 612 whether the received packet is encapsulated within an outer header used for load balancing. For example, encapsulation may be identified by a specific VLAN ID that indicates a specific type of encapsulation. If the packet is not encapsulated, the method 600 includes forwarding 614 the packet through an egress port based on the packet header (e.g., based on Layer 2 and/or Layer 3 destination information). If, however, the packet is encapsulated with an outer header used for load balancing, the method 600 includes determining 616 an egress port from the encapsulation information. For example, the encapsulation information may include an indication of an ingress port through which the system originally received the packet from the external network. The method 600 may determine 616 that the egress port is either the same port through which the packet was originally received or a different port based on a mapping of the ingress port to a different egress port. The method 600 further includes decapsulating 618 the packet to restore the packet to its condition when first received from the network, and forwarding 620 the packet to the determined egress port.

It will be understood by those having skill in the art that many changes may be made to the details of the above-described embodiments without departing from the underlying principles of the invention. The scope of the present invention should, therefore, be determined only by the following claims.

The invention claimed is:

1. A method for stateless load balancing of network packets within a system in communication with a network, the system including a switch in communication with a plurality of processing resources, and configured to avoid detection by a network client or end user, the method comprising:
receiving, at the switch, a packet through a port from the network, the received packet including one or more original headers comprising a plurality of fields for directing the received packet through the network;
hashing at least one of the fields of the one or more original headers to generate a hash value;
indexing a hashing table using the hash value to identify a processing resource within the system for processing the received packet;
encapsulating the received packet to produce an encapsulated packet with an outer header that includes at least an indication of the port through which the received packet was received, wherein the encapsulated packet maintains, without any modification, the one or more original headers as received from the network in the received packet; and
forwarding, from the switch, the encapsulated packet to the identified processing resource within the system.

2. The method of claim 1, further comprising:
receiving, at the switch, the encapsulated packet on a return path from the identified processing resource within the system;
determining that the encapsulated packet on the return path includes the outer header;
determining, from the outer header, the port through which the received packet within the encapsulated packet was received from the network;
based on the port through which the received packet was received from the network, determining an egress port for returning the packet to the network;
decapsulating the encapsulated packet to obtain a recovered packet that is identical to the received packet; and
forwarding, from the switch, the recovered packet through the egress port to the network.

3. The method of claim 2, wherein the egress port is the same as the port through which the received packet was received from the network.

4. The method of claim 2, wherein the egress port is different than the port through which the received packet was received from the network, and wherein the egress port is selected based on a mapping function performed on the port through which the received packet was received from the network.

5. The method of claim 1, wherein the outer header further includes forwarding or addressing information for directing the encapsulated packet to the identified processing resource within the system.

6. The method of claim 1, wherein the identified processing resource within the system performs application processing on the encapsulated packet, and wherein a set of processing resources comprises a load balancing group that is assigned the specific processing.

7. The method of claim 1, further comprising:
classifying the received packet based on packet header or other packet data to determine the services assigned to be performed on different types of packet flows, wherein the identified processing resource is a member of a load balancing group corresponding to a classification identified for the received packet.

8. The method of claim 1, wherein the encapsulating comprises adding a new media access control (MAC) header to the received packet using a MAC-in-MAC encapsulation scheme, wherein the new MAC header includes a tag identifying the port through which the received packet was received.

9. The method of claim 8, wherein the hashing table identifies next hop information for inclusion in the new MAC header for routing the encapsulated packet within the system.

10. The method of claim 1, wherein the encapsulating comprises adding a virtual local area network (VLAN) tag to the received packet, and wherein the VLAN tag identifies the port through which the received packet was received.

11. The method of claim 10, wherein the hashing table identifies next hop information for inclusion in the VLAN tag for routing the encapsulated packet within the system.

12. The method of claim 1, wherein the encapsulating comprises adding a multiprotocol label switching (MPLS) header to the received packet.

13. The method of claim 12, wherein the hashing table identifies next hop information for inclusion in the MPLS header for routing the encapsulated packet within the system.

14. A system comprising:
a plurality of nodes, each node corresponding to a one or more processing resources;
a switch device in communication with the plurality of nodes, the switch device for receiving a packet through a port from a network, the received packet including one or more original headers comprising a plurality of fields for directing the received packet through the network;
a stateless load balancer within the switch device, wherein the stateless load balancer comprises:
a hashing module for hashing at least one of the fields of the one or more original headers to generate a hash value, and for indexing a hashing table using the hash value to identify a processing resource within the system for processing the received packet; and
an encapsulation/decapsulation module for encapsulating the received packet to produce an encapsulated packet with an outer header including an indication of the port through which the received packet was received, wherein the encapsulated packet maintains, without any modification, the one or more original headers as received from the network in the received packet; and
a packet forwarder for forwarding the encapsulated packet to the identified processing resource within the system.

15. The system of claim 14, wherein the encapsulation/decapsulation module is further configured to:
receive the encapsulated packet on a return path from the identified processing resource within the system;
determine that the encapsulated packet includes the outer header;
determine, from the outer header, the port through which the received packet within the encapsulated packet was received from the network;
based on the port through which the received packet was received from the network, determine an egress port for returning the packet to the network; and
decapsulate the encapsulated packet to obtain a recovered packet that is identical to the received packet; and
wherein the packet forwarder is further configured to forward the recovered packet through the determined port to the network.

16. The system of claim 15, wherein the egress port is the same as the port through which the received packet was received from the network.

17. The system of claim 15, wherein the egress port is different than the port through which the received packet was received from the network, and wherein the egress port is selected based on a mapping function performed on the port through which the received packet was received from the network.

18. The system of claim 14, wherein the outer header further includes forwarding or addressing information for directing the encapsulated packet to the identified processing resource within the system.

19. The system of claim 14, wherein the system comprises a bladed system, and wherein the plurality of nodes each comprises a modular blade configured to be removably coupled to a chassis of the system.

20. The system of claim 19, wherein the bladed system comprises an Advanced Telecommunications Computing Architecture (ATCA) system.

21. The system of claim 20, wherein the switching device comprises an Ethernet switch on a hub blade connected to the plurality of nodes through an ATCA backplane of the ATCA system.

22. The system of claim 14, wherein the identified processing resource within the system performs application processing on the encapsulated packet, and wherein a set of processing resources comprises a load balancing group that is assigned the specific application processing.

23. The system of claim 14, further comprising:
a packet classification module for classifying the received packet based on packet header or other packet data to determine the services assigned to be performed on different types of packet flows, wherein the identified processing resource is a member of a load balancing group corresponding to a classification identified for the received packet.

24. The system of claim 14, wherein the encapsulation/decapsulation module performs the encapsulating by adding a new media access control (MAC) header to the received packet using a MAC-in-MAC encapsulation scheme, wherein the new MAC header includes a tag identifying the port through which the received packet was received.

25. The system of claim 24, wherein the hashing table identifies next hop information for inclusion in the new MAC header for routing the encapsulated packet within the system.

26. The system of claim 14, wherein the encapsulation/decapsulation module performs the encapsulating by adding a virtual local area network (VLAN) tag to the received packet, and wherein the VLAN tag identifies the port through which the received packet was received.

27. The system of claim 26, wherein the hashing table identifies next hop information for inclusion in the VLAN tag for routing the encapsulated packet within the system.

28. The system of claim 14, wherein the encapsulation/decapsulation module performs the encapsulating by adding a multiprotocol label switching (MPLS) header to the received packet.

29. The system of claim 28, wherein the hashing table identifies next hop information for inclusion in the MPLS header for routing the encapsulated packet within the system.

30. A non-transitory computer-readable medium comprising program code for causing a processor to perform a method for stateless load balancing of network packets within a system in communication with a network, the system including a switch in communication with a plurality of processing resources, the method comprising:
receiving, at the switch, a packet through a port from the network, the received packet including one or more original headers comprising a plurality of fields for directing the received packet through the network;
hashing at least one of the fields of the one or more original headers to generate a hash value;
indexing a hashing table using the hash value to identify a processing resource within the system for processing the received packet;
encapsulating the received packet to produce an encapsulated packet with an outer header that includes at least an indication of the port through which the received packet was received, wherein the encapsulated packet maintains, without any modification, the one or more original headers as received from the network in the received packet; and
forwarding, from the switch, the encapsulated packet to the identified processing resource within the system.

31. A system for load balancing network traffic, the system comprising:
means for receiving a packet through a port from a network, the received packet including one or more first headers comprising a plurality of fields for directing the received packet through the network;
means for hashing at least one of the fields of the one or more first headers to generate a hash value;
means for indexing a hashing table using the hash value to identify a processing resource within the system for processing the received packet;
means for encapsulating the received packet to produce an encapsulated packet with a second header including an indication of the port through which the received packet was received, wherein the encapsulated packet maintains, without any modification, the one or more first headers as received from the network in the received packet; and
means for forwarding the encapsulated packet to the identified processing resource within the system.

* * * * *